June 5, 1956　　E. DENNISON ET AL　　2,748,519
DUCK DECOY
Filed May 28, 1953
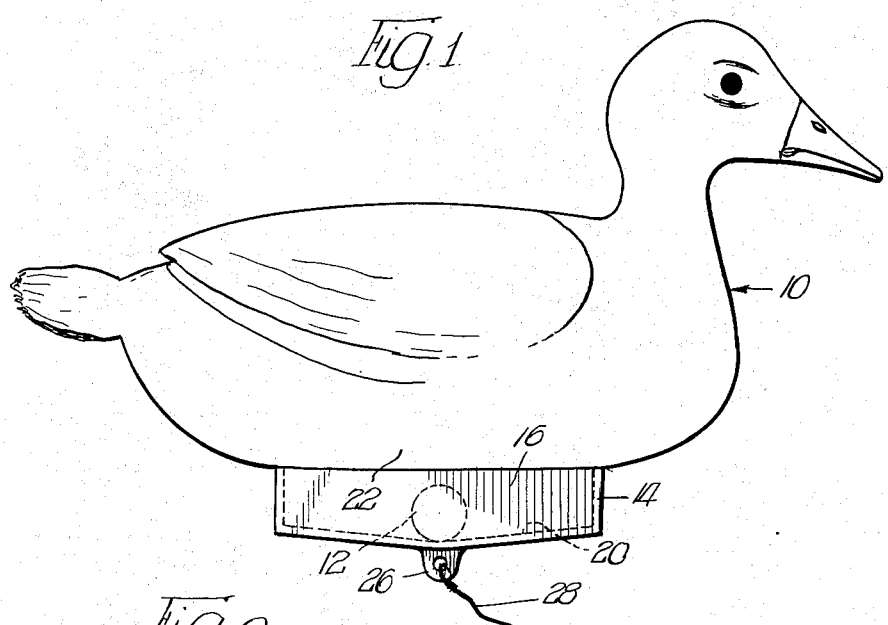
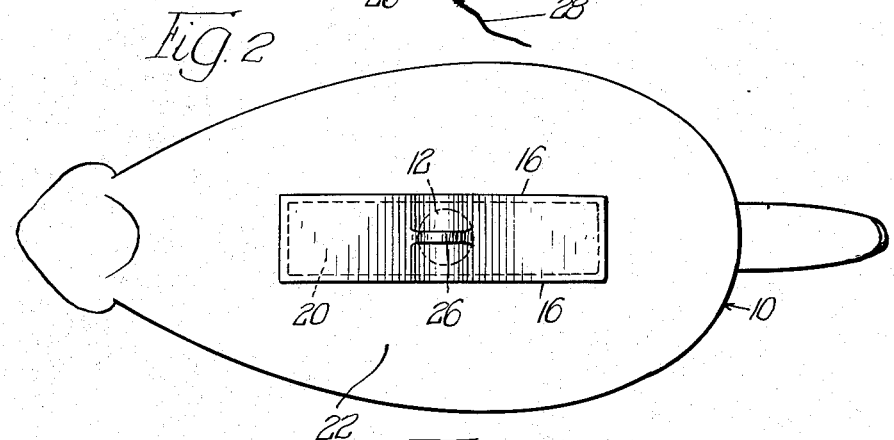
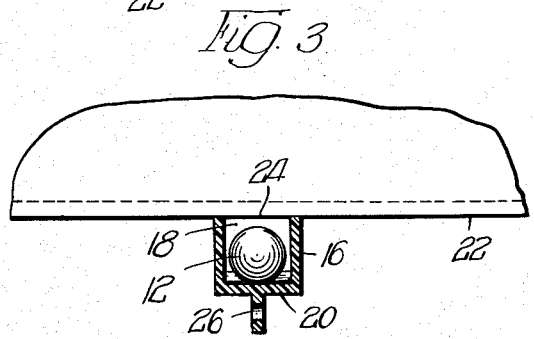
INVENTORS.
Earl Dennison,
BY Jack E. Wells,

United States Patent Office 2,748,519
Patented June 5, 1956

2,748,519
DUCK DECOY

Earl Dennison and Jack E. Wells, Newbern, Tenn., assignors to Wells-Dennison Co., Newbern, Tenn., a partnership Application May 28, 1953, Serial No. 358,126

1 Claim. (Cl. 43—3)

This device relates to hunting equipment and, more particularly, to an improved decoy for use in duck hunting.

When the usual form of decoy is thrown in the water, it will often capsize. In addition, the lack of motion in the usual form of decoy detracts from its natural appearance.

Another difficulty encountered in the standard variety of decoy is that it often becomes entangled with floating weeds or other debris.

One object, therefore, of the present invention is to provide an improved duck decoy which shall be adapted to "bob" naturally in the water, thus enhancing the illusion of a live duck. For this reason, it is another object of the invention to provide a superior means of activating the decoy so that not only will said decoy respond to the motions of wind and water, but the effect of these forces will actually be enhanced.

Yet another object of the invention is to provide an improved decoy which will not remain capsized after it is tossed into the water, but will instead right itself automatically.

Another object of the present invention is to provide an improved decoy which shall be adapted to readily rotate in a horizontal plane in response to a slight amount of wind, in addition to the aforementioned bobbing motion, so as to create an even more life-like effect.

A further object is to provide an improved decoy duck whose motions shall be such as to help clear the weeds or the like therefrom.

With these and various other objects in view the invention consists of certain novel features of construction and operation as will be more fully described and particularly pointed out in the specification, drawings and claim appended hereto.

In the drawings, which illustrate an embodiment of the device and wherein like reference characters are used to designate like parts:

Figure 1 is a view in side elevation of one embodiment of the present invention;

Figure 2 is a plan view of the bottom of this embodiment; and

Figure 3 is a transverse cross sectional view in perspective of a portion of the device, including the box and ball.

The decoy seen in Figure 1 in the form of a duck is referred to generally by the numeral 10. A ball 12 made of suitable heavy metal or the like constitutes the activating means which produces the bobbing effect previously referred to. This ball 12 is encased in a box-like housing 14 which is longitudinally disposed along the central portion of the undersurface of said decoy. As best seen in Figure 3, said box-like housing 14 is provided with side walls 16, end walls 18 and bottom portion 20, and roof 24 formed by the hull 22, all of which constitute a guide for said weighted ball 12.

As best seen in Figure 1, the inner surface of the bottom 20 is two sections which intersect at an obtuse angle with respect to one another.

One possible method of construction of the decoy here disclosed would utilize two vertical half sections made of plastic or other suitable material, said halves being adapted to be fitted together in a vertical plane so as to form the completed decoy.

In the preferred form of the device, the hull 22 has a bottom from which the housing 14 depends. Thus in operation, if the decoy 10 is in capsized position, the ball 12 will act as ballast tending to right the device. When the decoy is upright and floating in proper position, the ball 12 will be activated by wind or waves and will roll on the bottom 20 of the dependent box member 14 in such a manner as to effect a bobbing or rocking motion in the decoy. Thus, if a wave causes the decoy to tilt forward the ball 12 will also tend to roll forward. But the upward inclination of the bottom 20 will then cause the ball 12 to roll in the opposite direction past the central portion of said bottom 20, whereby the ball will once again reverse its direction. This action will be repeated continuously, causing the rocking or bobbing action already referred to.

As best seen in Figure 1, the bottom piece 20 of the dependent box 14 is also provided with an eyelet 26 in the central portion thereof, said eyelet being outwardly disposed with respect to said box. A novel type of motion will result when the decoy is anchored by a line 28 secured to said eyelet 26. Thus, instead of the waving or wobbling motion which results from anchoring the device at the head or tail portion thereof, a rotating or spinning motion will occur. This motion in conjunction with the bobbing motion resulting from the rolling of the ball 12 along the bottom 20 of the box 14 will lend an appearance of life-like activity to the decoy. In addition, the circling motion of the decoy 10 will aid in keeping said line 28 free from seaweed and the resultant clogging and the attendant hampering of motion.

While we have herein described and upon the drawings shown illustrative embodiments of the invention, it is to be understood that the invention is not limited thereto, but may comprehend other constructions, arrangements of parts, details and features without departing from the spirit of the invention.

We claim:

A decoy duck for bobbing naturally in the water enhancing the illusion of a live duck comprising, a buoyant body hull having a bottom, a housing disposed longitudinally along the central portion of said bottom, a rollable weighted ball in said housing, said housing comprising a bottom wall providing a supporting surface for said ball and including two segments which meet at an obtuse angle with respect to one another, side walls providing a guide for said ball, and end walls providing a stop for said ball, said side walls and said end walls being disposed in upright position with respect to said bottom wall and being affixed to the bottom of said body portion, said supporting surface being adapted to roll said ball toward the central portion after tilting by surface waves have rolled said ball toward an end portion thereof, and an anchor line affixed to the bottom of said housing at the center thereof.

References Cited in the file of this patent

UNITED STATES PATENTS

| | | |
|---|---|---|
| 841,429 | Passage | Jan. 15, 1907 |
| 934,342 | Oliver et al. | Sept. 14, 1909 |
| 1,254,428 | Myers | Jan. 22, 1918 |
| 1,272,003 | Cameron | July 9, 1918 |
| 1,392,065 | Klock | Sept. 27, 1921 |
| 1,857,939 | Cameron | May 10, 1932 |
| 2,650,453 | Martin | Sept. 1, 1953 |